3,428,865
DEVICE FOR MONITORING MULTI-PHASE ELECTRIC POWER SUPPLY SYSTEM AND PROVIDING CONTROL SIGNAL IN RESPONSE TO PROPER OPERATION OF SUCH SYSTEM
Henry L. Opad, 245 Bennett Ave.,
New York, N.Y. 10040
Filed Feb. 7, 1967, Ser. No. 614,488
U.S. Cl. 317—31      10 Claims
Int. Cl. H02h 3/28

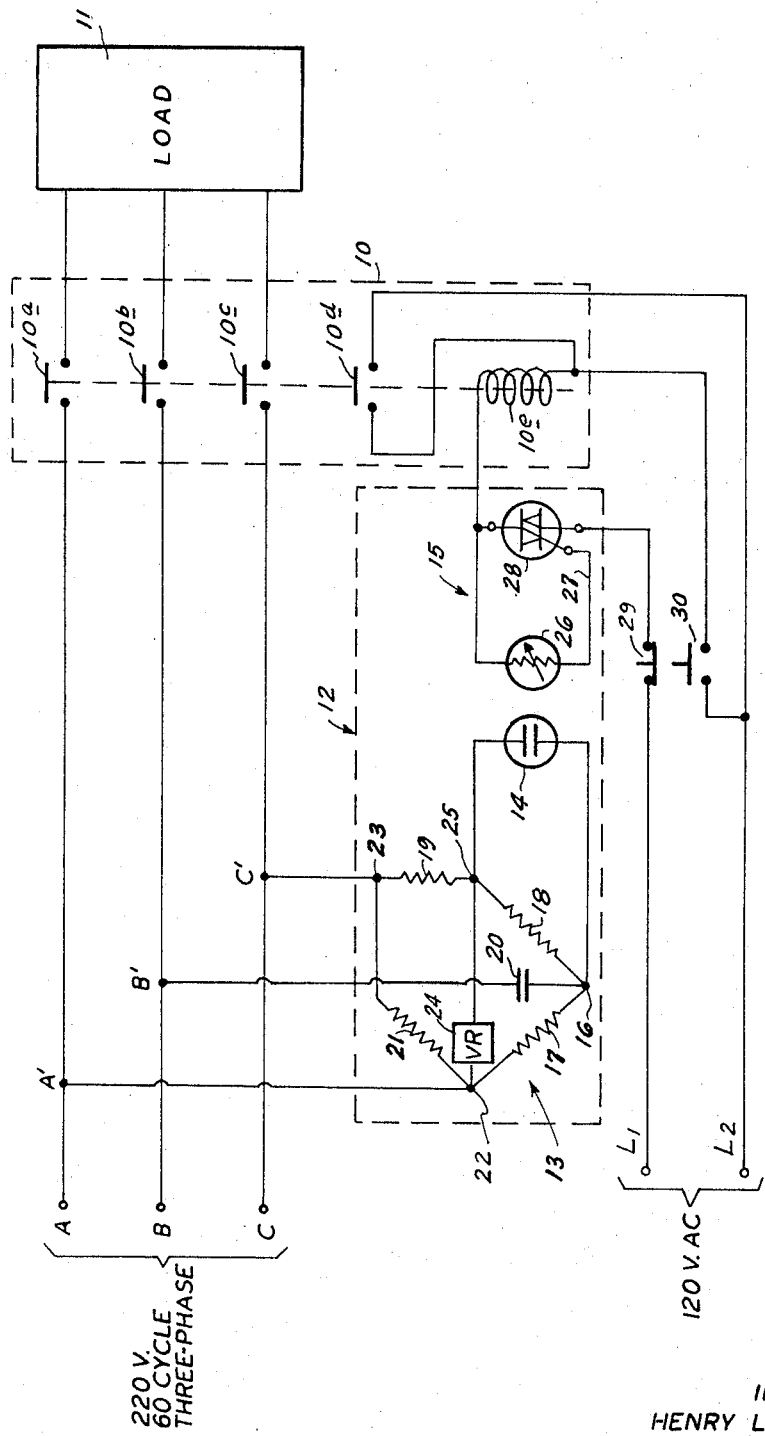
INVENTOR
HENRY L. OPAD
BY
ATTORNEY

United States Patent Office 3,428,865
Patented Feb. 18, 1969

ABSTRACT OF THE DISCLOSURE

A sensing circuit has a resistive-capacitive network connected in shunt to a three-phase power supply to provide a voltage drop across a sensing resistor of the network which exceeds the ignition and maintaining voltage of a neon lamp in parallel with such resistor only when at least a predetermined voltage appears on all phases of the power supply in correct sequence, and a control circuit energizable from an independent power supply includes a light-dependent resistor activated by illumination from the neon lamp to provide a low resistance path for a gating current which triggers a bi-directional triode semi-conductor switch from a blocking state to a conducting state so that current can pass therethrough from the independent current supply, for example, to a contactor for connecting a load to the three-phase power supply. A non-linear resistance, preferably in the form of a varistor, is connected between resistive legs of the resistive-capacitive network to ensure that the voltage across the sensing resistor is sufficiently reduced to extinguish the neon lamp when a voltage failure occurs on the phase to which the capacitive leg of the network is connected.

SPECIFICATION

This invention relates generally to multi-phase, for example, three-phase, power supply systems, and is particularly directed to a device which, upon a failure of voltage on one or more of the phases or a reversal of the normal phase sequence, actuates a control circuit, for example, to disconnect a load from the power supply.

When electrical equipment is operated from a three-phase 220 volt power supply, it is desirable, and frequently specified, that controls for such equipment, for example, contactors, relays or the like to control the connection thereof to the three-phase supply, be powered from an independent, relatively lower voltage electrical source, such as as 120 volt A.C. supply to reduce the hazards to personnel coming in contact with the control devices. Further, electrical equipment operated from a three-phase power supply may be damaged or incorrectly operated in the event of a reversal of the normal phase sequence or a failure or loss of voltage on any one or more of the phases.

Although devices have been provided for selectively connecting a load to a three-phase power supply system in accordance with the sensed condition of such power supply, or for indicating such sensed condition, the existing devices have various disadvantageous characteristics. Some of the existing devices are only sensitive to a failure of one or more phases or only sensitive to a phase reversal, or, if capable of responding to both a phase failure and a phase reversal, the sensitivity to a failure or loss of voltage on one of the phases is not as great as the sensitivity to a failure on the other two phases so that the reliability of the device is adversely affected. Some of the existing devices are also incapable of operating reliably in connection with a multi-phase power supply that undergoes an otherwise permissible voltage variation. Still other known devices, for example, as disclosed in U.S. Patent No. 3,215,865, issued Nov. 2, 1965 to B. H. Grimme, Jr., do not electrically isolate the circuits which monitor the three-phase power supply from the circuit that controls the connection of a load to such supply and therefore are not applicable to systems where the controlling circuit must be electrically isolated or independent from the power supply circuit. The arrangement disclosed in the identified patent also has the disadvantages of requiring a sensitive control relay, and of subjecting the solid state diodes of the bridge included therein to the hazard of voltage breakdown due to transients.

Accordingly, it is an object of this invention to provide a device having a sensing circuit which is equally sensitive to a failure of voltage on any of the phases of a three-phase power supply and also to a reversal of the normal phase sequence and, in any such event, controls a solid state element which is electrically isolated from the sensing circuit and hence from the three-phase power supply, for example, to cause an electrically independent control circuit to disconnect a load from the three-phase supply.

Another object is to provide a device of the described character which employs solid state components exclusively in its sensing and control circuits.

Still another object is to provide a device of the described character which is arranged to employ components of small mass so that all of the necessary circuitry can be embodied in a compact assembly for use where minimum size and weight of the device are important considerations.

A further object is to provide a device of the described character which can be reliably employed in connection with a multi-phase power supply that undergoes voltage variation within a substantial permissible range.

A device in accordance with this invention comprises a sensing circuit having a resistive-capacitive network connected in shunt to a three-phase power supply and a neon lamp connected across a sensing resistor included in one of the resistive legs of the network to have a voltage drop across such resistor which exceeds the ignition and maintaining voltage of the neon lamp, and hence causes illumination of the latter, only when at least a predetermined voltage appears on all phases of the power supply in the correct sequence, and a control circuit connected with an independent power supply and including a light-dependent resistor activated by illumination from the neon lamp to provide a low resistance path for a gating current which triggers a bi-directional triode semi-conductor switch from a blocking state to a conducting state so that current can pass therethrough from the independent power supply, for example, to operate a contactor connecting a load to the three-phase power supply.

In accordance with another feature of this invention, means constituting a non-linear resistance, preferably in the form of a varistor, is connected between the resistive legs of the resistive-capacitive network to ensure that the voltage drop across the sensing resistor will be sufficiently reduced to extinguish the neon lamp even when a voltage failure or open circuit occurs on the phase to which the capacitive leg of the network is connected.

The above, and other objects, features and advantages of the invention, will be apparent in the following detailed description of an illustrative embodiment which is to be read in connection with the accompanying drawing, wherein the single view is a wiring diagram of the described embodiment.

Referring to the drawing in detail, there is shown a 220 volt three-phase, 60 cycle, alternating current power supply circuit comprising phase conductors A, B and C. A neutral conductor of such circuit is not shown as it is not concerned with this invention. The voltages carried by conductors A,B and C are 120° out of phase and the normal or correct sequence is assumed to be in the order A,B,C. Conductors A,B and C may be connected through normally open contacts 10a, 10b and 10c of a conventional contactor 10 to a suitable load 11 the character of which is immaterial to this explanation. Contactor 10 is further shown to have a normally open hold contact 10d and a coil 10e which may be energized, as hereinafter described, to close contacts 10a–10d.

The monitoring and controlling device 12 in accordance with this invention is shown to comprise a sensing circuit made up of a resistive-capacitive network 13 connected in shunt with the three-phase conductors A, B and C, and a neon lamp 14 which is intended to be illuminated only when all conductors A,B and C carry adequate voltages in the correct sequence. Device 12 further generally comprises a control circuit 15 electrically isolated from the sensing circuit, and hence from the three-phase power supply, and adapted to control the operation of contactor 10 from an electric power supply, for example, lines $L_1$ and $L_2$ carrying 120 volt alternating current, which is independent of the three-phase power supply A,B,C.

The resistive-capacitive network 13 is shown to have resistive legs extending at A′ and C′ from conductors A and C to a junction 16 and respectively including a resistor 17 and series connected resistors 18 and 19, and a capacitive leg extending at B′ from conductor B to junction 16 and including a capacitor 20. The neon bulb 14 is shown connected across resistor 18, constituting the sensing resistor of network 13, so as to be illuminated only when the voltage drop across resistor 18 exceeds the ignition and maintaining voltage of lamp 14.

In accordance with this invention, network 13 further includes a resistor 21 connected between the resistive legs at junctions 22 and 23, respectively, disposed between resistor 17 and connection A′ and between resistor 19 and connection C′, and a component 24 connected between junction 22 in the resistive leg containing resistor 17 and a junction 25 in the other resistive leg intermediate resistors 18 and 19.

Component 24 constitutes a non-linear resistance, as is preferably provided by a varistor, so that there is little current flow through component 24 so long as the voltage at junction 22 is below a predetermined value, but the current through component 24 increases sharply when the voltage at junction 22 exceeds that predetermined value.

The control circuit 15 is shown to include a light-dependent resistor 26 disposed proximate to neon bulb 14 to receive illumination therefrom and being interposed in a gating circuit 27 for a bi-directional triode semiconductor switch 28 which may be of the type known as "Triac." The solid state switch 28 is interposed in the circuit for operating the device to be controlled from the power supply $L_1$, $L_2$, for example, in series with the coil 10e of contactor 10, as shown. So long as neon lamp 14 is extinguished, resistor 26 interposes a high resistance in gating circuit 27 so that insufficient current flows to the gate of switch 28 to maintain the latter in its conducting state. Thus, switch 28 is in its blocking state and coil 10e is deenergized to disconnect load 11 from three-phase power supply A, B, C. However, when neon lamp 14 is illuminated, the resistance of light-dependent resistor 26 is sharply decreased and current flows therethrough to the gate of solid state switch 28 to change the latter from its blocking state to its conducting state.

If desired, as shown, a normally closed, push-button stop switch 29 and a normally open, push-button start switch 30 may be connected in series with solid state switch 28 and coil 10e in the energizing circuit for the latter, and the holding contact 10d of contactor 10 may be connected in parallel with start switch 30.

Typical components used in a practical realization of the device 12 are as follows::

| Reference No. | Description | Mfgr's Part No. |
|---|---|---|
| 14 | Neon lamp | General Elec. NE 76. |
| 17 | Resistor—56,000 ohms, ½w | Ohmite. |
| 18 | Resistor—47,000 ohms, ¼w | Do. |
| 19 | Resistor—39,000 ohms, ½w | Do. |
| 20 | Capacitor—.02 mfg., 600 v | Sprague 6 PS-S20. |
| 21 | Resistor—100,000 ohms, ¼w | Ohmite. |
| 24 | Varistor | Carborundum Co. 479-BNR-52. |
| 26 | Light-dependant resistor | Clairex CL-5M4L. |
| 28 | Solid state switch | General Elec. SC 41 B. |

The above described embodiment of the invention operates as follows:

When the three-phase power supply is operating normally and the three conductors A, B and C carry adequate peak voltages occurring first on conductor A, then on conductor B and finally on conductor C, the voltage developed across resistor 18 will be high enough to ignite and thereafter maintain the illumination of neon lamp 14. Thus, the resistance of light-dependent resistor 26 is sharply reduced, so that, when start switch 30 is manually closed, current can flow from power supply $L_1$, $L_2$ through the reduced resistance of resistor 26 to the gate of solid state switch 28 to trigger the latter from blocking state to conducting state, whereupon coil 10e is energized to close its contacts 10a–10d. Closing of contacts 10a, 10b and 10c connects load 11 to three-phase power supply A, B, C, and closing of contact 10d establishes a holding circuit for coil 10e to maintain the energization of the latter until either stop switch 29 is manually actuated or solid state switch 28 is returned from its conducting state to its blocking state upon a sharp increase in the resistance of light-dependent resistor 26 in response to extinguishing of lamp 14.

In the event of a phase reversal, that is, if the peak voltage occurs first on conductor C, then on conductor B and finally on conductor A rather than in the normal A, B, C phase sequence, the voltage developed across resistor 18 is decreased below the maintaining voltage of neon lamp 14 so that the latter is extinguished and the resistance of resistor 26 is sharply increased to change solid state switch from its conducting state to its blocking state, whereby coil 10e is deenergized to disconnect load 11 from the three-phase power supply.

When there is a loss of voltage on one of the phases A, B and C, or a break in one of the connections A′, B′ and C′, the resistors 17, 18 and 19 and the capacitor 20 of the resistive-capacitive network would not alone ensure a reduction of the voltage across resistor 18 to a value below the ignition or maintaining voltage of lamp 14, particularly if the two remaining phases were in proper sequence. However, resistor 21 and varistor 24 which are included in the resistive-capacitive network in accordance with this invention overcome such difficulty in the following manner:

If either the phase A or the phase C, that is, a phase connected to a resistive leg of the network, is deenergized and the remaining phases are in proper sequence, the circuit is reduced to a simple arrangement of capacitor 20 in series with a paralleled combination of resistors 17, 18, 19 and 21 connected across a single phase source of power. In that case, the voltage distribution is in direct proportion to the respective impedance of the several components. The addition of resistor 21, in accordance with the invention, facilitates the reduction of the impedance of the resistive portion of the circuit with respect to the impedance of the capacitor 20, so that the voltage developed across the resistive portion will be low enough to ensure extinguishing of neon lamp 14.

It will be apparent that, when three-phase power supply A, B and C has adequate voltage peaks on all phases in the correct sequence, the voltage across resistors 18 and 19 is high and, therefore, the voltage at the junction 22 between resistor 17 and varistor 24 is relatively low to cause relatively little current flow through varistor 24. However, if phase B, that is the phase connected to the capacitive leg of the network, is deenergized, the capacitor 20 no longer produces a voltage shift and, therefore, the voltage increases at junction 22. Due to the non-linearity of varistor 24, such increase in the voltage at junction 22 causes a sharp increase in the current through varistor 24 to produce a correspondingly large voltage drop across resistor 19. The large voltage drop across resistor 19 correspondingly decreases the voltage drop across resistor 18 to a value below the ignition and maintaining voltage of neon lamp 14 to ensure extinguishing of the latter.

Thus, the failure of voltage on any of phases A, B or C or a reversal of the normal phase sequence reliably causes change of switch 28 from its conducting state to its blocking state and thereby causes contactor 10 to disconnect load 11 from the three-phase power supply so as to avoid damage to the load or its incorrect operation. Although the control circuit 15 is shown and described as controlling a contactor 10 for connecting and disconnecting the load 11, it will be apparent that any other suitable device may be controlled by circuit 15 in accordance with the sensed condition of the three-phase power supply.

Since resistor 26 of control circuit 15 is only actuated by light energy from lamp 14 in sensing circuit 13, the control circuit 15 is electrically isolated from the high voltage three-phase power supply and various components associated with circuit 15 can be disposed at locations where personnel may have ready access thereto without undue hazard to such personnel.

The use of neon bulb 14 as the component of sensing circuit 13 which is made operative in response to the normal operation of the three-phase power supply permits minimization of the size of capacitor 20. Further, the fact that the sensing circuit 13 consists of solid state components permits reduction of the power requirements thereof to very low values and ensures the reliability of its operation.

It is further to be noted that the device 12 is of "failsafe" design, that is, solid state switch 28 will not conduct and provide an electrical signal for operation of contactor 10 or any other controlled component if there is a break in any of the connections A', B', C' or if any of such connections are improperly made, nor will an electrical signal be provided if the neon lamp 14 becomes inoperative.

Although an illustrative embodiment of the invention has been described in detail herein with reference to the drawing, it is to be understood that the invention is not limited to that precise embodiment, and that various changes and modifications may be effected therein by one skilled in the art without departing from the scope or spirit of the invention as defined in the appended claims.

What is claimed is:

1. A device for monitoring a three-phase alternating current power supply comprising a sensing circuit that includes a resistive-capacitive network for connection to the three-phase power supply and a neon lamp which is illuminated only when there is adequate peak voltage on all three phases in the proper sequence, and a control circuit connected with a power supply independent of said three-phase power supply, and including solid state switching means to provide an electric control signal only when said switching means is triggered from its normal blocking state to its conducting state, said switching means including light-dependent means positioned to receive illumination from said neon bulb for triggering said switching means to said conducting state only when said bulb is illuminated.

2. A device according to claim 1; said switching means being constituted by a bi-directional triode semi-conductor switch having a gating circuit, and said light-dependent means being a resistor interposed in said gating circuit to permit current flow through said gating circuit for triggering said switch to its conducting state when the light dependent resistor receives illumination from said neon bulb.

3. A device according to claim 1; said resistive-capacitive network including a first resistive leg, a capacitive leg and a second resistive leg which are joined to each other and adapted for connection respectively to the phase conductors of the three-phase power supply on which peak voltages appear in said proper sequence, said second resistive leg having a sensing resistor across which said neon lamp is connected so as to be illuminated only when the voltage across said sensing resistor exceeds the ignition and maintaining voltage of said lamp and an additional resistor in series with said sensing resistor between the latter and the connection of said second resistive leg to the respective phase conductor, and non linear resistance means connected between said first resistive leg, at a location intermediate the resistance thereof and the connection of said first resistive leg to the respective phase conductor, and said second resistive leg, at a location intermediate said sensing resistor and said additional resistor, said non-linear resistance means normally blocking substantial current flow therethrough and responding to an increase in the voltage at its junction with said first resistive leg upon a failure of voltage in the phase conductor connected to said capacitive leg to sharply increase the current flow through said non-linear resistance means and thereby reduce the voltage across said sensing resistor below said ignition and maintaining voltage of the neon lamp.

4. A device according to claim 3; said non-linear resistance means consisting of a variator.

5. A device according to claim 3; said resistive-capacitive network further including resistance means connected between said first and second resistive legs so as to form a paralleled combination with the resistances of said resistive legs, which paralleled combination of resistances is in series with said capacitive leg upon a failure of voltage on one of the phase conductors connected with said resistive legs and ensures reduction of the voltage across said sensing resistor below said igniting and maintaining voltage of the neon lamp even though the remaining phase voltages are in said proper sequence.

6. A device according to claim 5; said non-linear resistance means consisting of a varistor.

7. A device according to claim 1; wherein said independent power supply is a source of relatively lower voltage, single-phase alternating current.

8. A device according to claim 1; wherein said control circuit has interposed therein an actuating coil of a contactor for connecting an electrical load to said three-phase power supply only when said coil is energized in response to the triggering of said solid-state switching means to its conducting state.

9. A device according to claim 1; said resistive-capacitive network including a capacitive leg and two resistive legs, one of said resistive legs having a sensing resistor therein across which said neon lamp is connected so as to be illuminated only when the voltage across said sensing resistor exceeds the ignition and maintaining voltage of said lamp, and non-linear resistance means connected between said resistive legs to ensure reduction of the voltage across said sensing resistor below said ignition and maintaining voltage of the lamp upon a failure of voltage on the phase of said three-phase power supply to which said capacitive leg is connected.

10. A device according to claim 9; said non-linear resistance means consisting of a varistor.

References Cited

UNITED STATES PATENTS 2,816,265  12/1957  Chamberlain _____ 317—47 X
2,975,334  3/1961   Callan _____ 317—48
3,242,383  3/1966   Opad _____ 317—31 X JOHN F. COUCH, *Primary Examiner.*

J. D. TRAMMELL, *Assistant Examiner.*

U.S. Cl. X.R.

307—127; 317—33, 46, 48, 130; 324—86